United States Patent
Li et al.

(10) Patent No.: US 12,192,438 B2
(45) Date of Patent: Jan. 7, 2025

(54) ROTATING STEREOSCOPIC DISPLAY DEVICE AND DISPLAY CONTROL METHOD

(71) Applicant: BOE Technology Group Co., Ltd., Beijing (CN)

(72) Inventors: Xi Li, Beijing (CN); Longhui Wang, Beijing (CN); Xuefeng Wang, Beijing (CN); Jinghua Miao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,408

(22) PCT Filed: Apr. 28, 2021

(86) PCT No.: PCT/CN2021/090520
§ 371 (c)(1),
(2) Date: Jun. 27, 2022

(87) PCT Pub. No.: WO2022/226832
PCT Pub. Date: Nov. 3, 2022

(65) Prior Publication Data
US 2024/0187564 A1  Jun. 6, 2024

(51) Int. Cl.
*H04N 13/393* (2018.01)
*H04N 13/398* (2018.01)

(52) U.S. Cl.
CPC ......... *H04N 13/393* (2018.05); *H04N 13/398* (2018.05)

(58) Field of Classification Search
CPC ...... H04N 13/393; H04N 13/398; G02F 1/33; G09G 3/00
(Continued)

(56) References Cited

U.S. PATENT DOCUMENTS

| 2007/0165024 A1 | 7/2007 | Tsao |
| 2018/0129106 A1 | 5/2018 | Gao et al. |

(Continued)

FOREIGN PATENT DOCUMENTS

| CN | 101022565 A | 8/2007 |
| CN | 109859663 A | 6/2019 |

(Continued)

OTHER PUBLICATIONS

Huang et al.(Machine translation of CN 112634799 A) (Year: 2021).*

(Continued)

*Primary Examiner* — Christopher S Kelley
*Assistant Examiner* — Ana Picon-Feliciano
(74) *Attorney, Agent, or Firm* — IPro, PLLC

(57) ABSTRACT

The present disclosure provides a rotating stereoscopic display device and a display control method. A rotating stereoscopic display device includes a base, a drive assembly arranged on the base, and a display panel capable of rotating driven by the drive assembly, wherein the display panel includes a plurality of display areas, the plurality of display areas comprising at least a first display area, at least a second display area and at least a third display area, pixel densities in the first display area, the second display area and the third display area decrease in turn, and at least one of the second display area and the third display area is arranged between the first display area and an edge of the display panel.

9 Claims, 6 Drawing Sheets

(58) Field of Classification Search
USPC .......................................................... 348/51
See application file for complete search history.

(56) References Cited

U.S. PATENT DOCUMENTS

2020/0394964 A1* 12/2020 Hyun .................... G09G 3/2007
2021/0344894 A1* 11/2021 Stokes .................... G09G 3/32
2022/0377314 A1    11/2022 Shao et al.

FOREIGN PATENT DOCUMENTS

| CN | 110602477 A |   | 12/2019 |   |           |
|----|-------------|---|---------|---|-----------|
| CN | 111261027 A |   | 6/2020  |   |           |
| CN | 112634799 A | * | 4/2021  |   | G09G 3/005 |

OTHER PUBLICATIONS

PCT/CN2021/090520 international search report and written opinion.

\* cited by examiner

ROTATING STEREOSCOPIC DISPLAY DEVICE AND DISPLAY CONTROL METHOD

CROSS-REFERENCE TO RELATED APPLICATIONS

This application is the U.S. national phase of PCT Application No. PCT/CN2021/090520 filed on Apr. 28, 2021, the disclosures of which is incorporated in its entirety by reference herein.

TECHNICAL FIELD

The present disclosure relates to the field of display technology, and particularly, to a rotating stereoscopic display device and a display control method.

BACKGROUND

Rotating stereoscopic display device refers to controlling the display panel to rotate, and controlling the display panel to display a corresponding image when the display panel is rotated to certain phase, so that the image observed by the user can be a stereoscopic image due to the visual residue, and a three-dimensional image can be displayed using a two-dimensional display device.

SUMMARY

Some embodiments of the present disclosure provide a rotating stereoscopic display device, including a base, a drive assembly provided on the base, and a display panel capable of rotating driven by the drive assembly, wherein the display panel includes a plurality of display area, the plurality of display areas including at least a first display area, at least a second display area, and at least a third display area, the pixel d density in the first display area, the second display area, and the third display area decrease in turn, at least one of the second display area and the third display area is disposed between the first display area and an edge of the display panel.

In some embodiments, at least one edge of the second display area coincides with the edge of the display panel.

In some embodiments, the display panel comprises a vertex region provided with the third display area, at least two edges of the third display area at the vertex region coinciding with edges of the display panel.

In some embodiments, the display panel includes a first axis, the display panel is rotated around the first axis, the first display area, the second display, and the third display area are symmetrically disposed about the first axis.

In some embodiments, the display panel further includes a second axis perpendicular to the first axis, and the first display area, the second display, and the third display area are symmetrically disposed about the second axis.

In some embodiments, the first display area does not overlap the first axis and at least one of the second display area and the third display area is disposed between the first display area and the first axis.

In some embodiments, the third display area includes a target third display area, the target third display area is located between two symmetrically disposed the first display areas, the target third display area overlaps the first axis, a second display area is arranged between the third display area and an edge of the display panel in the direction of the first axis.

In some embodiments, the first display area includes a first sub-area and a second sub-area, the pixel density of the first sub-area is greater than the pixel density of the second sub-area, the second sub-area is located at the vertex of the first display area, at least two edges of the second sub-area coincide with the edges of the first display area, the second sub-area is adjacent to the second display area, and the second sub-area is separated from the third display area.

In some embodiments, the area ratio of the first display area, the second display area, and the third display area is 30% to 35%:45% to 55%:10% to 20%.

In some embodiments, the pixel density ratio of the first display area, the second display area, and the third display area is 1:0.4 to 0.7:0.1 to 0.3.

Some embodiments of the present disclosure provide a display control method applied to a rotating stereoscopic display device provided by some aspects of the present disclosure, the method including:
  according to the three-dimensional image to be displayed, determining a two-dimensional image displayed by the display panel at each rotation phase;
  in the case where a pixel unit exists in a target area of the display panel corresponding to a target pixel in the two-dimensional image, controlling the corresponding pixel unit to display the target pixel;
  in the case where no pixel unit exist in a target area of the display panel corresponding to the pixel in the two-dimensional image, the pixel unit adjacent to the target area is controlled to display the target pixel.

BRIEF DESCRIPTION OF THE DRAWINGS

In order to more clearly illustrate the technical solutions of the embodiments of the present disclosure, a brief description will be given below with reference to the accompanying drawings which are required to be used in the description of the embodiments of the present disclosure; it is obvious that the drawings in the following description are only some embodiments of the present disclosure, and it would have been obvious for ordinary skill in the art to obtain other drawings according to these drawings without involving any inventive effort.

DETAILED DESCRIPTION

Reference will now be made in detail to the embodiments of the present disclosure, examples of which are illustrated in the accompanying drawings. It will be apparent that the described embodiments are part of, but not all of, the embodiments of the present disclosure. Based on the embodiments in the present disclosure, all other embodiments obtained by ordinary skill in the art without inventive effort within the scope of the present disclosure.

Some embodiments of the present disclosure provide a rotating stereoscopic display device.

In some embodiments, the rotating stereoscopic display device comprises a rotatable display panel, and in some embodiments, the display panel is a micro-diode (Mini LED) display panel, each Mini LED forming a pixel of the display panel.

In some embodiments, rotating stereoscopic display device refers to using a display panel to display a two-dimensional image, and when the display panel is driven to rotate, due to the persistence of vision effect of the human eye, when the display panel rotates fast enough, the image displayed by the display panel may temporarily stay in place in the observation effect of the human eye, and the image observed by the human eye forms a three-dimensional image.

Each rotation of the display panel corresponds to refreshing one frame of the image, and since the image exhibits a three-dimensional stereoscopic effect, in the present embodiment, each frame of the image is referred to as a volume frame, and the region swept by the pixels in each two-dimensional image during the rotation forms a voxel.

Figure 1:
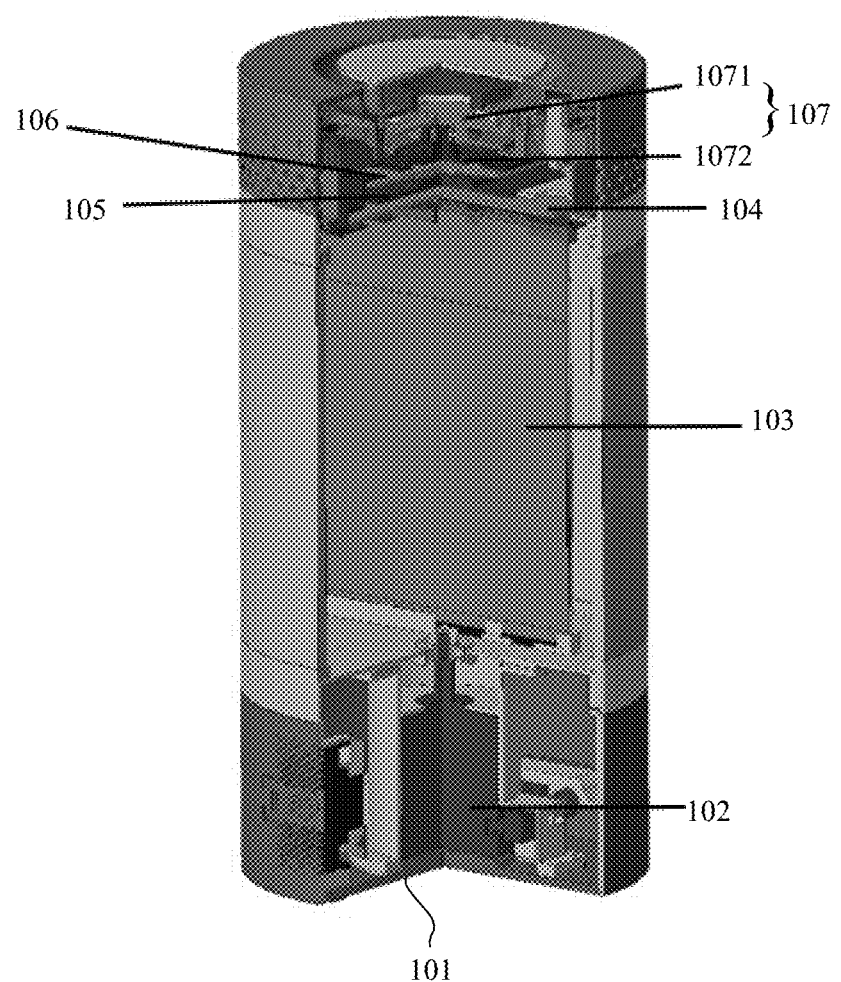
FIG. 1 is a structural diagram of a rotating stereoscopic display device in some embodiments of the present disclosure.
Figure 2:
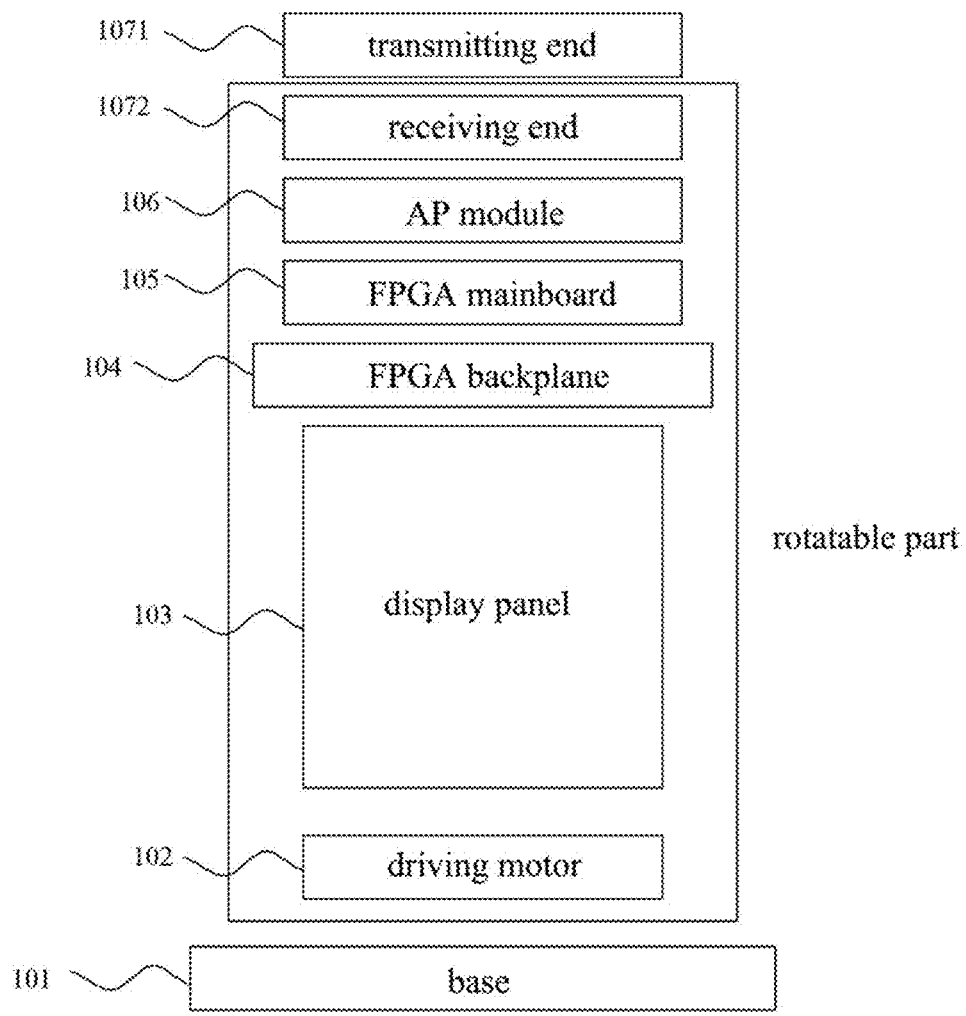
FIG. 2 is an architectural diagram of a rotating stereoscopic display device in some embodiments of the present disclosure.
Figure 3:
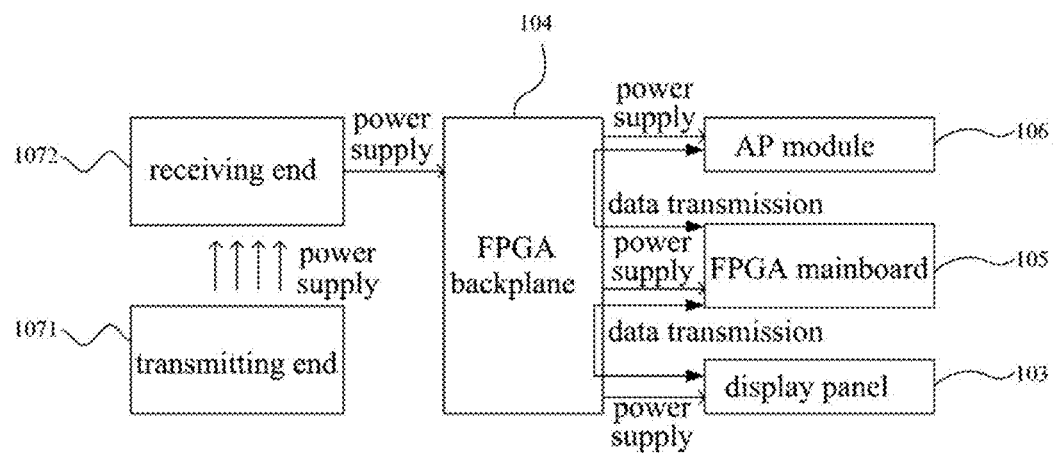
FIG. 3 is an operational schematic diagram of a rotating stereoscopic display device according to some embodiments of the present disclosure.

As shown in FIGS. 1 to 3, in some embodiments, a rotating stereoscopic display device includes a base 101, a drive device (which may be a drive motor 102 in this embodiment), a display panel 103, an FPGA Programmable Gate Array 104, an FPGA mainboard 105, an AP (Application Processor) module 106, and a power supply module 107.

The base 101 is used as a counterweight and support of the rotating stereoscopic display device, and the drive motor 102 is used to rotate the display panel. The FPGA backplane 104 is used for bearing an FPGA mainboard 105; the FPGA mainboard 105 is used for receiving and storing model data to be displayed; the AP module 106 may specifically comprise one or more items of a Bluetooth sub-module, a wireless network sub-module and a data transmission sub-module in the near field; and the AP module 106 is mainly used for realizing data interaction so as to receive and send external data and data to be displayed, etc.

The power supply module 107 may be a wired power supply module or a wireless power supply module, and for example, may comprise a wireless power supply transmitting end 1071 and a receiving end 1072 so as to supply power for a rotating stereoscopic display device.

In some embodiments, the display panel 103, the FPGA backplane 104, the FPGA main board 105, the AP module 106 and the receiving end 1072 of the power supply module 107 all constitute a rotatable part and can rotate driven by the drive motor 102, and the base 101 and the transmitting end 1071 of the power supply module 107 are fixed.

As shown in FIG. 3, during operation, the transmitting end 1071 and the receiving end 1072 cooperate and supply power for the rotating stereoscopic display device by means of wireless power supply; after receiving data to be transmitted, the AP module 106 sends same to the FPGA main board 105 and further sends same to the display panel through the FPGA main board 105 so as to realize image display; and signals between the AP module 106, the FPGA main board 105 and the display panel 103 can realize data transmission based on different protocols or interfaces such as SPI (Serial Peripheral Interface) and IIC (Inter-Integrated Circuit).

It should be understood that the specific structure of the rotating stereoscopic display device is not limited thereto and may be adjusted or modified according to actual needs.

Figure 4:
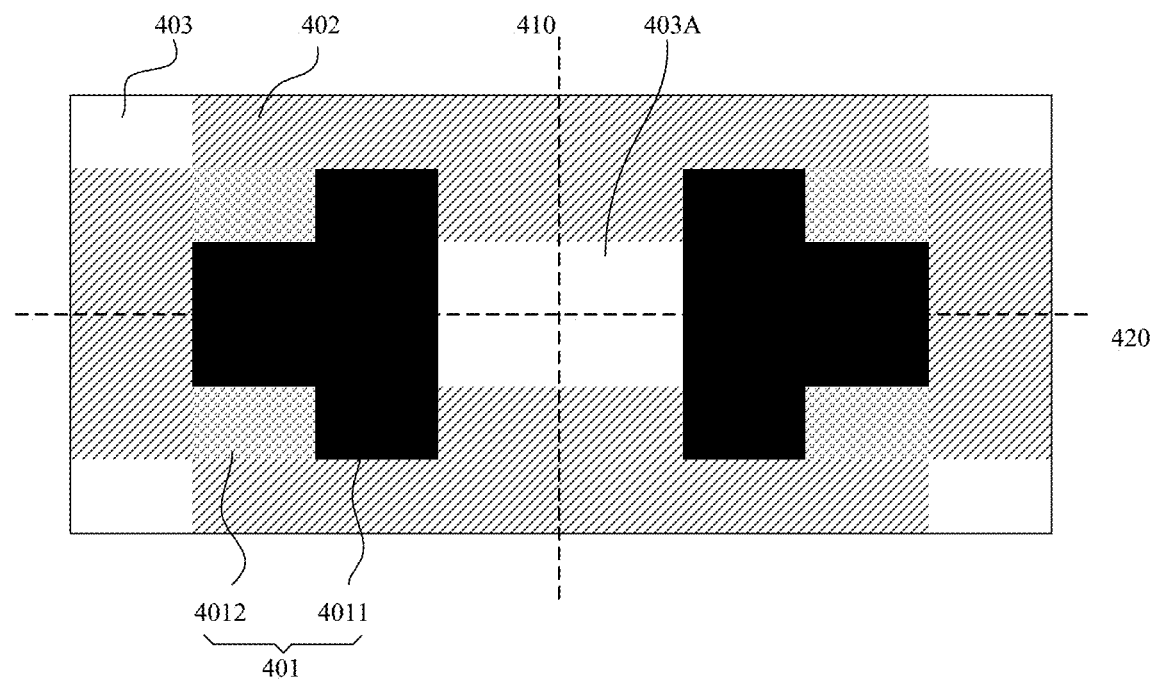
FIG. 4 is a zoned schematic diagram of a display panel in some embodiments of the present disclosure.
Figure 5:
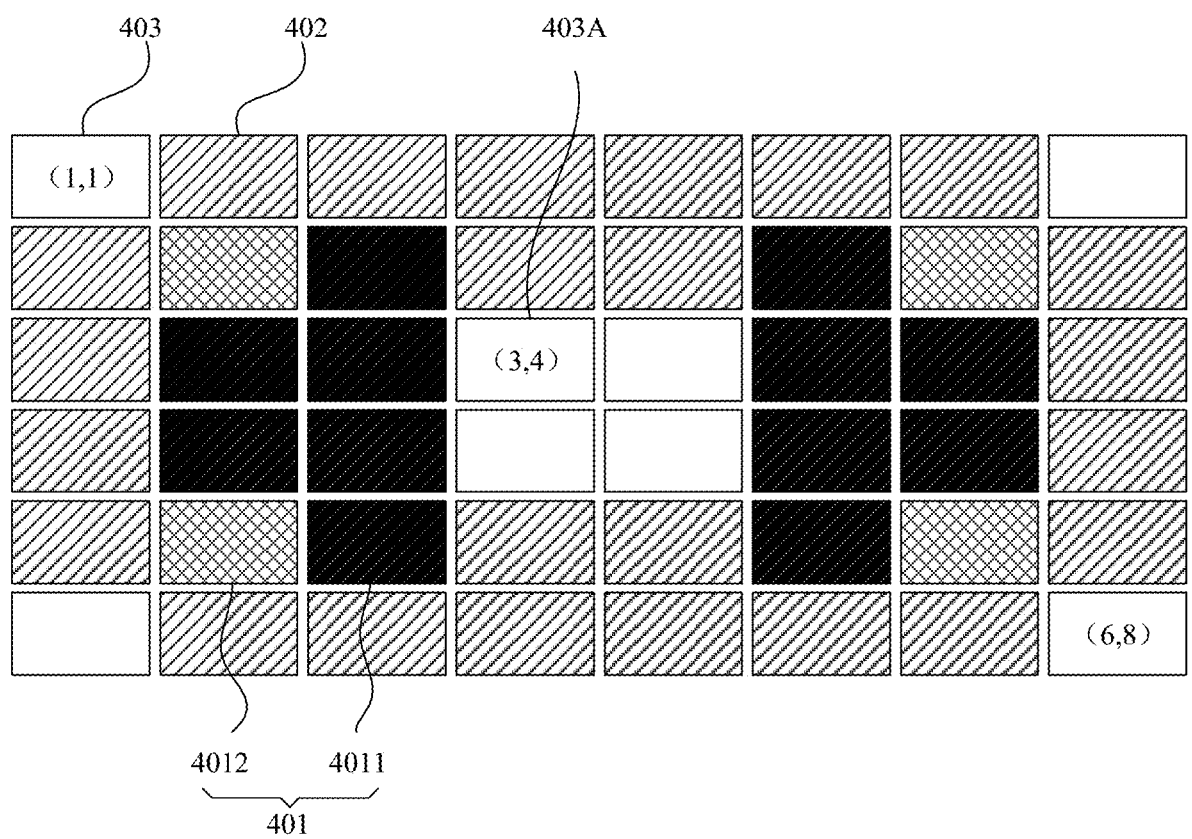
FIG. 5 is a further zoned schematic diagram of a display panel in some embodiments of the present disclosure.

As shown in FIGS. 4 and 5, the display panel includes a plurality of display areas in some embodiments, and the display areas in this embodiment may be a plurality of virtual areas formed by dividing an effective display area (AA area) of the display panel according to a certain rule.

The plurality of display areas comprises at least a first display area 401, at least a second display area 402 and at least a third display area 403, and the pixel density in the first display area 401, the second display area 402 and the third display area 403 decrease in turn.

In the technical solution of some embodiments, the display panel is divided into a plurality of display areas, and the pixel densities of the display areas are not equal, and in the case where the display panel is a Mini LED display panel, it can be specifically controlled that the number of Mini LEDs in different display areas is not equal.

At least one of a second display area 402 and a third display area 403 is arranged between the first display area 401 and the edge of the display panel; it can be understood that the first display area 401 with a relatively high pixel density is not distributed in the edge area of the display panel, and the edge of the display panel has a relatively small influence on the display effect; therefore, the display areas adjacent to the edge of the display panel are both the second display area 402 and/or the third display area 403 with a relatively low pixel density; it can be understood that the display areas distributed in the edge area of the display panel are one or both of the second display area 402 and the third display area 403, while the first display area 401 is not distributed in the edge area of the display panel 103.

By controlling the pixel density to be unequal in different display areas, the number of pixel units can be reduced, thereby helping to save power. Furthermore, as the pixel density decreases, the number of required traces also decreases, thereby reducing the trace pressure and helping to improve the reliability of the display panel.

In some embodiments, at least two edges of the third display area located at the vertex region coincide with the edges of the display panel, in other words, the display panel comprises a vertex region provided with the third display area 403.

Illustratively, as shown in FIGS. 4 and 5, in the case where the display panel is rectangular, the display panel includes four vertices, and in some embodiments, two edges of the third display area 403 respectively overlap two edges of the display panel on either side of the vertex, that is, the display area adjacent to the vertex is the third display area 403 with a pixel density less than the pixel density of other areas.

In some embodiments, the space formed by the rotation of the display panel is referred to as a display space, wherein the display area near the vertex actually corresponds to a circular ring-shaped area at the edge of the display space, and the probability of including effective display content in the circular ring-shaped area is small, so that the area can be arranged as the third display area 403 with a small pixel density, and at the same time, the user pays more attention to the central portion area of the display control when viewing the image displayed by the rotating stereoscopic display device.

In some embodiments, at least one edge of the second display area 402 coincides with an edge of the display panel, it being understood that the display panel includes an edge region along which at least a portion of the second display area 402 is disposed such that at least one edge of the second display area 402 coincides with an edge of the display panel. The edge area of the display panel forms an outer surface of the display space, and illustratively, when the display panel is a rectangular display panel, the edge area of the display panel corresponds to upper and lower surfaces and side surfaces of the cylindrical display space. Since the content to be displayed is mainly distributed in the central part of the display space, the display area along the edge area is controlled as the second display area 402 in this embodiment to reduce the pixel distribution density of the edge area of the display panel.

As shown in FIG. 4, in some embodiments, the display panel includes a first axis 410 about which the display panel can rotate.

It will be appreciated that the display panel needs to be rotated at a high speed during operation. In general, in order to meet the response time for the human eye to have a persistence of vision effect, the speed of rotation of the display panel needs to be controlled to be no less than 20 cycles per second. In order to ensure smooth rotation of the display panel, in general, the display panel needs to be rotated about the axis of symmetry of the display panel.

In this embodiment, the first axis 410 may be an axis of symmetry of the display panel, and the display panel is rotatable about the first axis 410. The first display area 401, the second display area and the third display area 403 are arranged symmetrically with respect to the first axis 410, so that the corresponding ranges of the first display area 401, the second display area 402 and the third display area 403 in the display space are independent from each other, that is, the first display area 401 and the second display area 402 do not rotate to the same position during the rotation of the display panel, thereby contributing to the uniformity of the display effect.

In some embodiments, the display panel further comprises a second axis 420 perpendicular to the first axis 410, in case the display panel is a rectangular display panel, the first axis 410 and the second axis 420 may be understood as two central axes of the display panel perpendicular to each other. The first display area 401, the second display area 403, and the third display area 403 are arranged symmetrically with respect to the second axis 420, and by controlling the symmetrical distribution of the display areas with respect to the second axis 420, the consistency and uniformity of the display effect can be improved.

In some embodiments, the first display area 401 does not overlap the first axis 410 and at least one of the second display area 402 and the third display area 403 is disposed between the first display area 401 and the first axis 410. It will be appreciated that the first display area 401 having a higher pixel density does not overlap the first axis 410, and that the display areas overlapping the first axis 410 are both the second display area 402 and the third display area 403 having a relatively lower pixel density.

It will be appreciated that during rotation of the display panel, the angle through which the pixel elements are rotated is the same at the same time, the greater the length through which the pixel elements are rotated further from the axis of rotation, the smaller the length through which the pixel elements are rotated closer to the axis of rotation, so that if the distribution density of the pixel elements in the display panel is the same, the smaller the voxel distribution density is the further from the axis, and the greater the voxel distribution density is the smaller the distance from the axis. For regions near the first axis 410, if the density of voxels is too high, the local brightness may be too high, possibly affecting the display effect.

By arranging that the first axis 410 overlaps with the second display area 402 and the third display area 403, and does not overlap with the first display area 401, it is possible to control a decrease in the density of pixel units of a region near the first axis 410, so that when the display panel is operated, the voxel density of the region near the first axis 410 decreases, helping to balance the uniformity of brightness between the region and other regions, thereby helping to improve the display effect.

In some embodiments, the third display area 403 comprises a target third display area 403A, the target third display area 403A is located between two symmetrically arranged sets of first display areas 401, the target third display area 403 overlaps the first axis 410, and the second display area 402 is arranged between the target third display area 403A and an edge of the display panel along the direction of the first axis 410.

It will be appreciated that the target third display area 403A is located in the most central region of the display panel, and it should be understood that the most central area is generally surrounded by the displayed three-dimensional image, and the displayed effective content is relatively less; in addition, considering that the most central area is the area which is most directly focused when a user views the display panel, and if the brightness is too high, it may cause a significant difference from the surrounding area, affecting the display effect; therefore, in some embodiments, providing the target third display area 403A in this area helps to reduce the display brightness of this area and improve the display effect.

In some embodiments, the first display area 401 includes a first sub-area 4011 having a pixel density greater than a pixel density of a second sub-area 4012 located on a side of a portion of the first sub-area 4011 near an edge of the display panel, and in some embodiments, a second sub-area 4012 located in a region of the first display area 401 near a vertex of the display panel.

The second sub-area 4012 is adjacent to the second display area 402, and the second sub-area 4012 is separated from the third display area 403; in this way, the second sub-area 4012 can be understood as a transition area between the first sub-area 4011 and the second display area 402; in this way, the display panel can be understood to transition according to the distribution mode of the first sub-area 4011, the second sub-area 4012 and the second sub-area 4012, which helps to improve the uniformity of brightness transition in the display space during the display process, and helps to improve the display effect.

In some embodiments, the area ratio of the first display area 401, the second display area 402, and the third display area 403 is 30% to 35%:45% to 55%:10% to 20%. In some embodiments, where the first display area 401 includes a first sub-area 4011 and a second sub-area 4012, the area of the first sub-area 4011 is approximately 25%, the area of the second sub-area 4012 is approximately 8.3%, the area of the second display area 402 is approximately 50%, and the area of the third display area 403 is approximately 16.7%.

In some embodiments, the pixel density ratio of the first display area 401, the second display area 402, and the third display area 403 is 1:0.4 to 0.7:0.1 to 0.3. In some of these embodiments, in case the first display area 401 comprises a first sub-area 4011 and a second sub-area 4012, the pixel density ratio of the first sub-area 4011 and the second sub-area 4012 is 1:0.75, the pixel density ratio of the first sub-area 4011 and the second display area 402 is 1:0.5, that is, the pixel density of the second display area 402 is half that of the first sub-area 4011, and further, the pixel density ratio of the first sub-area 4011 and the second display area 402 is 1:0.25.

Next, a display panel is exemplified as a certain Mini LED panel.

The Mini LED panel has a rectangular shape, comprising six rows and eight columns of a total of 48 subareas. In this embodiment, the display area of the Mth row and the Nth column is denoted as a display area (M, N), wherein M is an integer with a value of 1 to 6, N is an integer with a value of 1 to 8, and the first axis 410 or the rotation axis of the display panel is the longitudinal central axis thereof.

As shown in FIGS. 4 and 5, only a part of the display areas are numbered in FIG. 5, and the number of the unmarked display area can be determined according to its position.

The first display area 401 comprises a display area (2, 2), a display area (2, 3), a display area (2, 6), a display area (2, 7), a display area (3, 2), a display area (3, 3), a display area (3, 6), a display area (3, 7), a display area (3, 2, a display area (4, 3), a display area (4, 6), a display area (4, 7), a display area (5, 2), a display area (5, 3), a display area (5, 6), a display area (5, 7), wherein the display area (2, 2), the display area (2, 7), the display area (5, 2), the display area (5, 7) is a second sub-area 4012, and the remaining first display area 401 is a first sub-area 4011.

The second display area 402 comprises a display area (1, 2), a display area (1, 3), a display area (1, 4), a display area (1, 5), a display area (1, 6), a display area (1, 7), a display area (2, 1), a display area (2, 4), a display area (2, 5), a display area (2, 8), a display area (3, 1), a display area (3, 8), a display area (4, 1), a display area (6, 8), a display area (5, 1), a display area (5, 4), a display area (5, 5), a display area (5, 8), a display area (6, 2), a display area (6, 3), display area (6, 4), display area (6, 5), display area (6, 6), display area (6, 7).

The third display area 403 comprises a display area (1, 1), a display area (1, 8), a display area (6, 1), a display area (6, 8), a display area (3, 4), a display area (3, 5), a display area (4, 4), and a display area (4, 5), as shown in FIGS. 4 and 5, wherein the display area (3, 4), the display area (3, 5), the display area (4, 4), and the display area (4, 5) in the third display area 403 are the target third display area 403A.

In the related art, each display area range corresponding to the same size display panel includes 16*12 Mini LEDs as an example. In the display panel of the present embodiment, 16*12 Mini LEDs are also included in the first sub-area 4011, so that the display panel of the present embodiment includes 5568 Mini LEDs in total, while the display panel of the related art includes 9216 Mini LEDs in total, and the display panel of the present embodiment reduces 3648 Mini LEDs in total the present embodiment reduces the power consumption of the display panel by about 39.4% by making an initial estimation that the power consumption of each Mini LED is equal.

The size occupied by the LED Driver (diode driving circuit) corresponding to each Mini LED and the corresponding walk-out thereof is about 20 mm*15 mm. When each display area is provided with 16*12 Mini LEDs, the sum of the line width of the tracks and the spacing between the tracks is about 0.2 mm, that is, the density of tracks is relatively large and the wiring pressure is large. In this embodiment, reducing the density of Mini LEDs in some display areas also helps to reduce the wiring pressure and improve the spacing between tracks, thereby helping to improve the reliability of the display panel.

With continuing reference to FIG. 5, in the present embodiment, the display panel comprises a pixel unit and a drive module. By way of example, in the case where the display panel is a Mini LED panel, the pixel unit can be a Mini LED, and the drive module can be an LED drive module LED Driver, wherein each display area is driven by one LED Driver. In implementation, each display area and a corresponding LED Driver can be connected via an SPI interface or the same to acquire a driving signal so as to realize image display.

Some embodiments of the present disclosure provide a display control method applied to a rotating stereoscopic display device provided in some aspects of the present disclosure.

Figure 6:
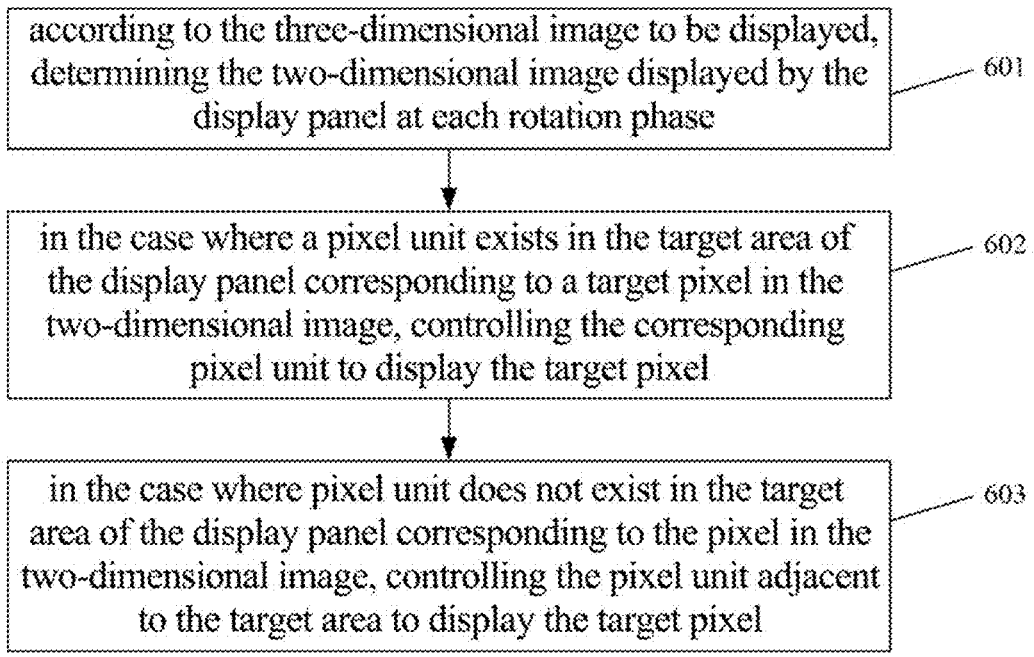
FIG. 6 is a flow diagram showing a control method in some embodiments of the present disclosure.

As shown in FIG. 6, the method comprises:
step 601: according to the three-dimensional image to be displayed, determining the two-dimensional image displayed by the display panel at each rotation phase;
step 602: in the case where a pixel unit exists in the target area of the display panel corresponding to a target pixel in the two-dimensional image, controlling the corresponding pixel unit to display the target pixel;
step 603: in the case where the pixel unit does not exist in the target area of the display panel corresponding to the pixel in the two-dimensional image, controlling the pixel unit adjacent to the target area to display the target pixel.

Figure 7:
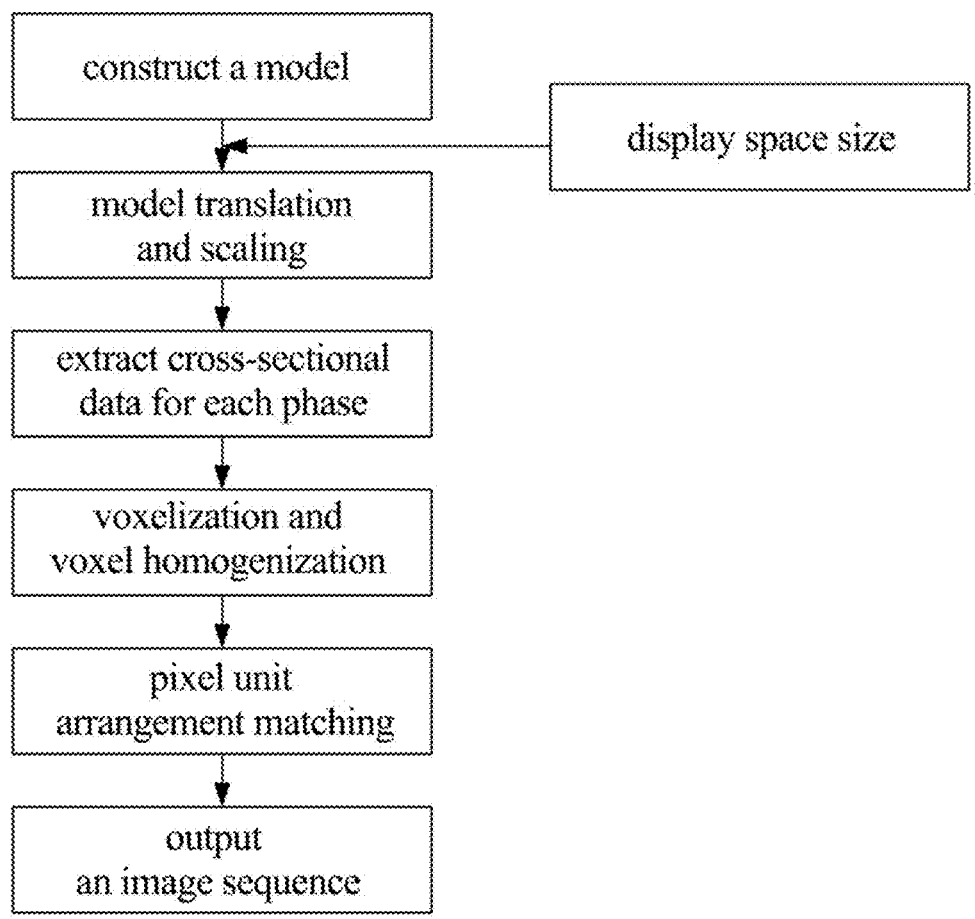
FIG. 7 is yet another flow diagram showing a control method in some embodiments of the present disclosure.

As shown in FIG. 7, in the technical solution of the present embodiment, model is firstly constructed, and specifically, three-dimensional model image to be displayed is established, wherein the three-dimensional model can be implemented using three-dimensional model software such as 3D MAX, pro/E and SolidWorks.

Next, a model translation and scaling is performed, and in particular, the established three-dimensional model is translated and scaled so as to be fully accommodated in the display space and properly scaled.

The display space refers to a space formed by the rotation of the display panel, for example, the display panel has a rectangular shape, the display panel rotates around one symmetry axis thereof, and the formed display space has a cylindrical shape, and for example, the display panel has an isosceles triangle shape, and rotates around the symmetry axis thereof, and the formed display space has a conical shape.

The contents displayed by the display panel at different positions are different, and therefore, a plurality of phases needs to be defined, and the display panel displays different contents at different phases. For example, each interval 2° is defined as one phase, then each volume frame has 180 phases, respectively corresponding to 180 cross-sectional patterns; if an interval of 3° is defined as one phase, each frame has 120 phases, corresponding to 120 cross-sectional patterns, respectively.

In implementation, the specific number of phases can be correspondingly increased or decreased, the rotation speed of the display panel can also be adaptively adjusted, and further, the refresh frequency of the display panel can be determined according to the rotation speed of the display panel and the number of phases.

Cross-sectional data for each phase is extracted. After the three-dimensional image to be displayed is accommodated in the display space, the two-dimensional image displayed by the display panel at each phase can be determined according to the cross section of each phase of the display panel intersecting with the three-dimensional image, and the two-dimensional images are sequentially arranged in phase order to form the image sequence to be displayed.

Next, voxelization and voxel homogenization are performed.

Each rotation of the display panel corresponds to refreshing one frame of the image. Since the image exhibits a three-dimensional stereoscopic effect, in the present embodiment, each frame of the image is referred to as an volume frame, and the region swept by the pixels in each two-dimensional image during the rotation forms a voxel. Thereby, the three-dimensional image to be displayed can be voxelized according to the determined display time of each two-dimensional image in combination with each two-dimensional image.

In some embodiments, the distribution of voxels may also be processed. Illustratively, voxels may be homogenized, such as by an octree point cloud compression algorithm, to make the distribution of voxels more homogenized throughout the display space.

Specifically, a cubic space bounding box is established as a root node, a minimum cubic bounding box is segmented layer by layer as a leaf node, and the same number of voxels are retained in each leaf node bounding box, so that the overall distribution of voxels is strictly homogenized, and a voxel homogenization image is obtained.

Next, pixel unit arrangement matching is performed, and since the pixel distribution density of different regions is different in this embodiment, a corresponding pixel unit may or may not exist in a region corresponding to the pixel in the two-dimensional image on the display panel.

There is a corresponding pixel unit in the target area corresponding to the target pixel in the two-dimensional image, and the pixel unit can be directly controlled to display the target pixel.

When there is no corresponding pixel unit in the target area corresponding to the target pixel in the two-dimensional image, in order to ensure that the target pixel is normally displayed, in the present embodiment, the target pixel is displayed using the pixel unit near the target area, and when implemented, the display effect of the pixel unit near the target area can be adjusted according to the distance and orientation between the pixel unit near the target area and the target area; in some embodiments, the target pixel may also be displayed directly using pixel units that are closed to the target area and do not need to display content, helping to reduce the amount of computation.

Finally, outputting an image sequence, specifically, outputting a matching image sequence, and when controlling the display panel to rotate to different phases, displaying a corresponding image.

While the present disclosure has been described with reference to specific embodiments thereof, it will be understood by those skilled in the art that various changes may be made and equivalents may be substituted for elements thereof without departing from the scope of the disclosure. Accordingly, the protection sought herein is as set forth in the claims below.

What is claimed is:

1. A rotating stereoscopic display device, comprising a base, a drive assembly arranged on the base, and a display panel, the display panel is driven by the drive assembly to rotate, the display panel comprising a plurality of display areas, the plurality of display areas comprising at least a first display area, at least a second display area and at least a third display area, a pixel density in the first display area, the second display area and the third display area decreases in turn, at least one of the second display area and the third display area is disposed between the first display area and an edge of the display panel-;
   wherein at least one edge of the second display area coincides with the edge of the display panel;
   wherein the display panel comprises a vertex region provided with the third display area, at least two edges of the third display area at the vertex region coincides with edges of the display panel.

2. The rotating stereoscopic display device according to claim 1, wherein the display panel comprises a first axis, wherein the display panel is rotatable about the first axis, the first display area, the second display and the third display area are symmetrically disposed about the first axis.

3. The rotating stereoscopic display device according to claim 2, wherein the display panel further comprises a second axis perpendicular to the first axis, the first display area, the second display, and the third display area are symmetrically disposed about the second axis.

4. The rotating stereoscopic display device according to claim 2, wherein the first display area does not overlap the first axis, and at least one of the second display area and the third display area is disposed between the first display area and the first axis.

5. The rotating stereoscopic display device according to claim 4, wherein the third display area comprises a target third display area located between two groups of the first display areas arranged symmetrically, the target third display area overlaps the first axis, a second display area is arranged between the third display area and an edge of the display panel in a direction of the first axis.

6. The rotating stereoscopic display device according to claim 4, wherein the first display area comprises a first sub-area and a second sub-area, the pixel density of the first sub-area is greater than the pixel density of the second sub-area, the second sub-area is located at a vertex of the first display area, at least two edges of the second sub-area coincide with the edges of the first display area, the second sub-area is adjacent to the second display area, and the second sub-area is separated from the third display area.

7. The rotating stereoscopic display device according to claim 1, wherein an area ratio of the first display area, the second display area, and the third display area is 30% to 35%: 45% to 55%: 10% to 20%.

8. The rotating stereoscopic display device according to claim 1, wherein the pixel density ratio of the first display area, second display area and third display area is 1:0.4 to 0.7:0.1 to 0.3.

9. A display control method, applied to the rotating stereoscopic display device according to claim 1, the method comprising:
   determining a two-dimensional image displayed by the display panel at each rotation phase according to the three-dimensional image to be displayed;
   controlling the corresponding pixel unit to display the target pixel in the case where a pixel unit exists in a target area of the display panel corresponding to a target pixel in the two-dimensional image; and
   controlling the pixel unit adjacent to the target area to display the target pixel in the case where no pixel unit exist in the target area of the display panel corresponding to the pixel in the two-dimensional image.

* * * * *